United States Patent
Nolan et al.

(10) Patent No.: US 10,415,967 B2
(45) Date of Patent: Sep. 17, 2019

(54) SYSTEM AND METHOD FOR DETERMINING A POSITION OF A LIGHT FIXTURE

(71) Applicant: ELECTRONIC THEATRE CONTROLS, INC., Middleton, WI (US)

(72) Inventors: Timothy P. Nolan, Madison, WI (US); Jonathan Kemble, Norfolk, MA (US); Mathias Wolf, Holzkirchen (DE)

(73) Assignee: Electronic Theatre Controls, Inc., Middleton, WI (US)

( * ) Notice: Subject to any disclaimer, the term of this patent is extended or adjusted under 35 U.S.C. 154(b) by 53 days.

(21) Appl. No.: 15/784,543

(22) Filed: Oct. 16, 2017

(65) Prior Publication Data
US 2019/0113339 A1    Apr. 18, 2019

(51) Int. Cl.
| G01C 11/30 | (2006.01) |
| G06T 7/60 | (2017.01) |
| A63J 5/02 | (2006.01) |
| A63J 1/02 | (2006.01) |
| F21V 21/15 | (2006.01) |
| G06T 7/70 | (2017.01) |

(52) U.S. Cl.
CPC .......... *G01C 11/30* (2013.01); *A63J 1/02* (2013.01); *A63J 5/02* (2013.01); *F21V 21/15* (2013.01); *G06T 7/60* (2013.01); *G06T 7/70* (2017.01)

(58) Field of Classification Search
CPC ......... F21W 2131/40; F21W 2131/406; G03B 21/20; H05B 37/029; F21V 21/14; F21V 21/15; F21V 21/30; G01C 11/30; A63J 5/02
See application file for complete search history.

(56) References Cited

U.S. PATENT DOCUMENTS

| 6,456,377 B1 | 9/2002 | Suzuki et al. |
| 6,529,853 B1 * | 3/2003 | Bauer ............... H04N 5/222 348/169 |
| 6,769,790 B2 | 8/2004 | Fruhm et al. |

(Continued)

FOREIGN PATENT DOCUMENTS

| GB | 2267160 A | 11/1993 |
| WO | 2015128143 A1 | 9/2015 |
| WO | 2017093373 A1 | 6/2017 |

OTHER PUBLICATIONS

Search Report issued by the United Kingdom Patent Office for related Application No. GB1812146.7 dated Dec. 24, 2018 (4 pages).

*Primary Examiner* — Peggy A Neils
(74) *Attorney, Agent, or Firm* — Michael Best & Friedrich LLP (57) ABSTRACT

A system for determining a position of a light fixture that projects a beam of light on to a stage to form a first beam pattern on the stage includes an observing device located at a predetermined position relative to the stage to observe the first beam pattern. The system also includes a controller in communication with the observing device. The controller is configured to capture from the observing device an image of the first beam pattern on the stage, determine a major dimension and a minor dimension of the first beam pattern from the image, and calculate a position of the light fixture based on the major dimension and the minor dimension.

19 Claims, 5 Drawing Sheets

(56) References Cited

U.S. PATENT DOCUMENTS

| | | | |
|---|---|---|---|
| 7,499,179 B2 | 3/2009 | Shiode | |
| 7,557,919 B2 | 7/2009 | Fukue | |
| 7,660,039 B2 * | 2/2010 | Santoro | F21S 11/00 359/599 |
| 7,750,969 B2 | 7/2010 | Sato et al. | |
| 7,899,577 B2 | 3/2011 | Ban et al. | |
| 8,416,282 B2 | 4/2013 | Lablans | |
| 8,624,895 B2 * | 1/2014 | Reese | G06F 3/14 345/426 |
| 8,917,905 B1 * | 12/2014 | Dill | A63J 1/02 382/103 |
| 9,036,245 B2 | 5/2015 | Hewlett et al. | |
| 9,157,795 B1 * | 10/2015 | Linnell | G01J 1/4257 |
| 9,560,345 B2 | 1/2017 | Grundhofer | |
| 9,562,672 B2 * | 2/2017 | Jorgensen | F21V 14/06 |
| 2005/0248299 A1 | 11/2005 | Chemel et al. | |
| 2010/0271476 A1 | 10/2010 | Damink et al. | |
| 2012/0286670 A1 | 11/2012 | Van Herk et al. | |
| 2013/0193855 A1 | 8/2013 | Bauer | |
| 2015/0138349 A1 | 5/2015 | Hebert et al. | |
| 2016/0134851 A1 | 5/2016 | Grundhofer | |
| 2018/0224100 A1 * | 8/2018 | Farnik | F21V 21/15 |

* cited by examiner

SYSTEM AND METHOD FOR DETERMINING A POSITION OF A LIGHT FIXTURE

FIELD OF THE DISCLOSURE

The present disclosure relates to a system and method for determining the position of a light fixture and more particularly to determining the position of the light fixture based on a beam pattern projected by the light fixture.

BACKGROUND OF THE DISCLOSURE

Traveling performances often include many moving light fixtures that must be set up and taken down every time the performance changes venue. Each venue has a different size and configuration, and the moving light fixtures are placed in slightly different positions at each venue. Accordingly, the light fixtures must be calibrated to their new positions in order to be aimed correctly by a lighting controller during the performance. Conventionally, an operator must manually calibrate each moving light fixture by pointing it to a known cue location, which is then used as a reference point by the lighting controller. Manually calibrating each light can be very time-consuming. Accordingly, a need exists for a system and method for determining the position of a light fixture without manual intervention by the operator.

SUMMARY OF THE DISCLOSURE

The present disclosure provides, in one aspect, a system for determining a position of a light fixture that projects a beam of light on to a stage to form a first beam pattern on the stage. The system includes an observing device located at a predetermined position relative to the stage to observe the first beam pattern (e.g., an elliptical beam pattern). The system also includes a controller in communication with the observing device. The controller is configured to capture from the observing device an image of the first beam pattern on the stage, determine a major dimension and a minor dimension of the first beam pattern from the image, and calculate a position of the light fixture based on the major dimension and the minor dimension.

The disclosure provides, in another aspect, a lighting system for illuminating a stage. The lighting system includes a light fixture including a base and a lamp assembly movable relative to the base, an observing device located at a predetermined position relative to the stage to observe the stage, and a controller in communication with the light fixture and the observing device. The controller is configured to control the light fixture to project a beam of light on to the stage to form a first beam pattern on the stage, capture from the observing device an image of the first beam pattern on the stage, and calculate a position of the light fixture based on the image. The controller is also configured to orient the light fixture, based on the calculated position, by moving the lamp assembly relative to the base to aim the light fixture onto a target location on the stage.

The disclosure provides, in another aspect, a method of calibrating a lighting controller. The method includes projecting a beam pattern on to a surface with a light fixture, capturing an image of the beam pattern on the surface, using the image to calculate a position of the light fixture based on at least one dimension of the beam pattern, and orienting the light fixture to illuminate a target position on the surface based on the calculated position of the light fixture.

Other features and aspects of the disclosure will become apparent by consideration of the following detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. In particular, it should be noted that a plurality of hardware and software based devices, as well as a plurality of different structural components may be utilized to implement the disclosure.

DETAILED DESCRIPTION

Figure 1:
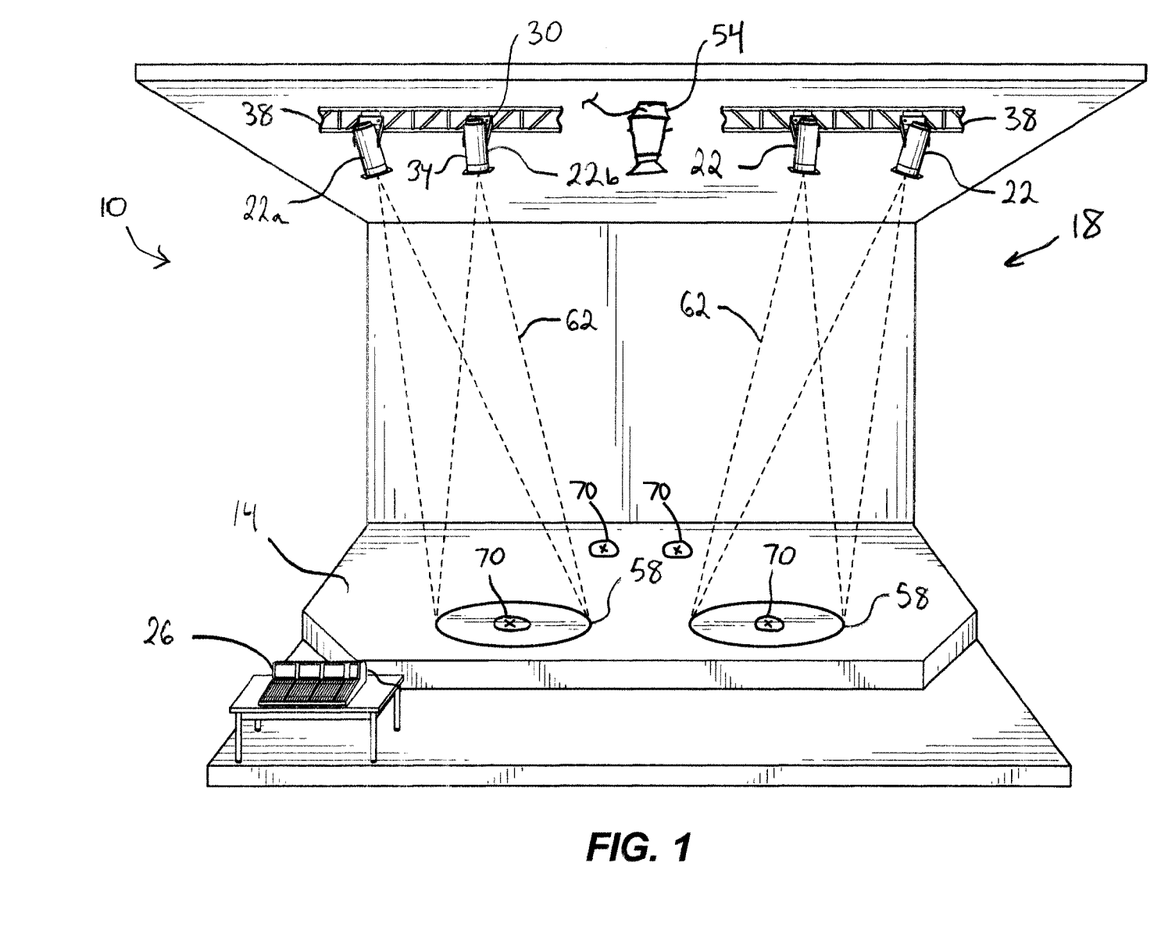
FIG. 1 illustrates a system for determining the position of a light fixture in a venue according to one embodiment of the invention.

FIG. 1 illustrates a lighting system 10 capable of illuminating portions of a stage 14 in a venue 18. The lighting system 10 includes a plurality of light fixtures 22 and a controller 26 in communication with one or more of the light fixtures 22 to control their operation. Each of the illustrated light fixtures 22 includes a base 30 and a lamp assembly 34 that is movable relative to the base 30. The lamp assembly 34 includes a lamp (e.g., an incandescent lamp, LED lamp, arc lamp, or any other suitable light source; not shown) and one or more enclosures, lenses, filters, mirrors, and the like, enabling the lamp assembly 34 to project light onto the stage 14. Each of the illustrated light fixtures 22 includes an electric motor (not shown) in communication with the controller 26 such that the controller 26 can control the orientation of the lamp assembly 34 relative to the base 30. In the illustrated embodiment, each of the light fixtures 22 is mounted on a support bar 38 that is suspended above the stage 14. It should be understood that in other embodiments, one or more of the light fixtures 22 may be mounted to other suitable structures at any desired position in the venue 18.

Figure 2:
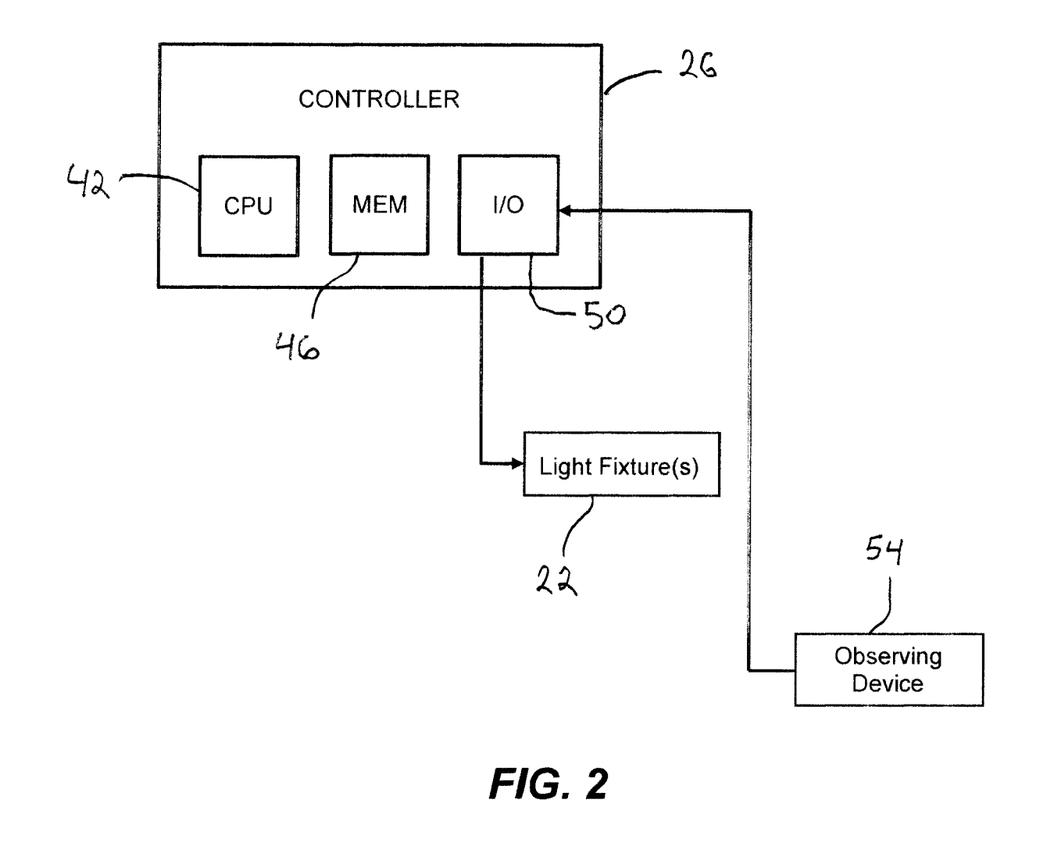
FIG. 2 is a schematic representation of a controller of the system of FIG. 1.

With continued reference to FIG. 1, the illustrated controller 26 is a lighting control board located within the venue 18. Alternatively, the controller 26 may be positioned elsewhere within the venue 18, remote from the venue 18, or may be integrated partially or completely into one or more of the light fixtures 22. With reference to FIG. 2, the controller 26 includes a plurality of electrical and electronic components that provide power, operational control, and protection to the components and modules within the controller 26. For example, the controller 26 may include an electronic processor or central processing unit 42 (e.g., a programmable microprocessor, microcontroller, or similar device), non-transitory, machine-readable memory 46, and an input/output interface 50. Software included in the implementation of the controller 26 can be stored in the memory. The software includes, for example, firmware, one or more applications, program data, filters, rules, one or more program modules, and other executable instructions. The controller 26 is configured to retrieve from memory 46 and execute, among other things, instructions related to the control processes and methods described herein. In other embodiments, the controller 26 may include additional, fewer, or different components.

Referring to FIG. 1, the lighting system 10 also includes an observing device 54, such as a digital still camera or video camera, in communication with the controller 26 (e.g., via the input/output interface 50). The observing device 54 is positioned at a predetermined position relative to the stage 14 such that at least a portion of the stage 14 is visible within the observing device's field of view. The controller 26 includes dimension information for the stage 14 stored in its memory 46. The dimension information may be manually entered by an operator, downloaded from portable storage media, the internet, etc, or observed by the observing device 54. The dimension information may include the length, width, and height of the stage 14, and the position of the observing device 54 relative to the stage 14. The dimension information can also include one or more target locations 70 on the stage (e.g., marked with tape), which determine the desired aiming locations for one or more of the light fixtures 22 during the performance on the stage 14. The controller 26 can use this dimension information in conjunction with image data obtained by the observing device 54 to determine the size and position of light beam patterns 58 appearing on the stage 14. As described below, the observing device 54 and the controller 26 act as a calibration system to determine the position of one or more of the light fixtures 22 relative to the stage 14 based on the light beam patterns 58 that the light fixtures 22 project on to the stage 14. By determining the positions of the light fixtures 22, the controller 26 can accurately orient the light fixtures 22 to aim the light fixtures 22 at the desired target location(s) 70.

Figure 3:
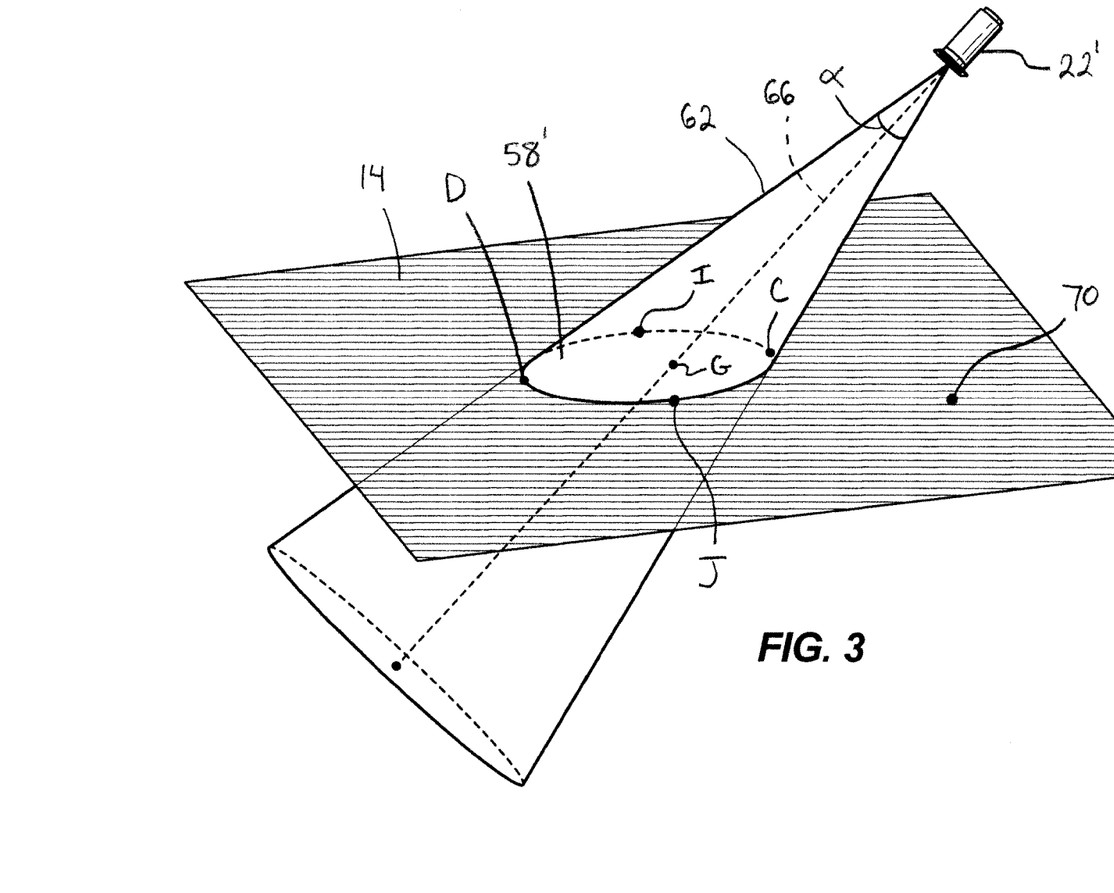
FIG. 3 illustrates an elliptical beam pattern projected onto a stage surface by a light fixture during a calibration operation.

With reference to FIG. 3, during a calibration operation, the controller 26 turns on a light fixture 22' to be calibrated, and the light fixture 22' projects a beam of light 62 on the stage 14. The beam 62 spreads out from the light fixture 22' at a beam angle or apex angle $\alpha$, such that the beam 62 has a conical shape. The beam angle $\alpha$ may be constant or may be varied (e.g., through the use of adjustable shutters, lenses, mirrors, and the like) between any number of beam angles.

The beam 62 creates an elliptical beam pattern 58' where it intersects the stage 14. In the illustrated embodiment, the light fixture 22' is oriented at an oblique angle relative to the stage 14. Accordingly, the beam pattern 58' is an ellipse. In other embodiments, the beam pattern 58' may be circular (e.g., if the light fixture 22' is oriented perpendicular to the stage 14). In yet other embodiments, the light fixture 22' may produce other beam patterns 58' by projecting differently-shaped beams of light 62, for example. As illustrated in FIG. 3, the light fixture 22' need not project the beam pattern 58' to the target location 70 or to any other particular position on the stage 14. Rather, the light fixture 22' can project the beam pattern 58' to any location on the stage 14 that is observable by the observing device 54.

Next, the observing device 54 (FIG. 1) captures an image of the beam pattern 58' on the stage 14 (FIG. 3). The illustrated elliptical beam pattern 58' has a major or maximum diameter extending between points C and D on the perimeter of the beam pattern 58'. The beam pattern 58' also has a minor or minimum diameter extending through points I and J on the perimeter of the beam pattern 58'. The controller 26 determines the positions of points C, D, I, and J on the stage 14 by analyzing image data from the observing device 54. The positions of points C, D, I, and J can be determined based on the dimensions of the stage 14 and the known position of the observing device 54 relative to the stage 14. The controller 26 can then calculate the position of the light fixture 22', as described below.

Figure 4:
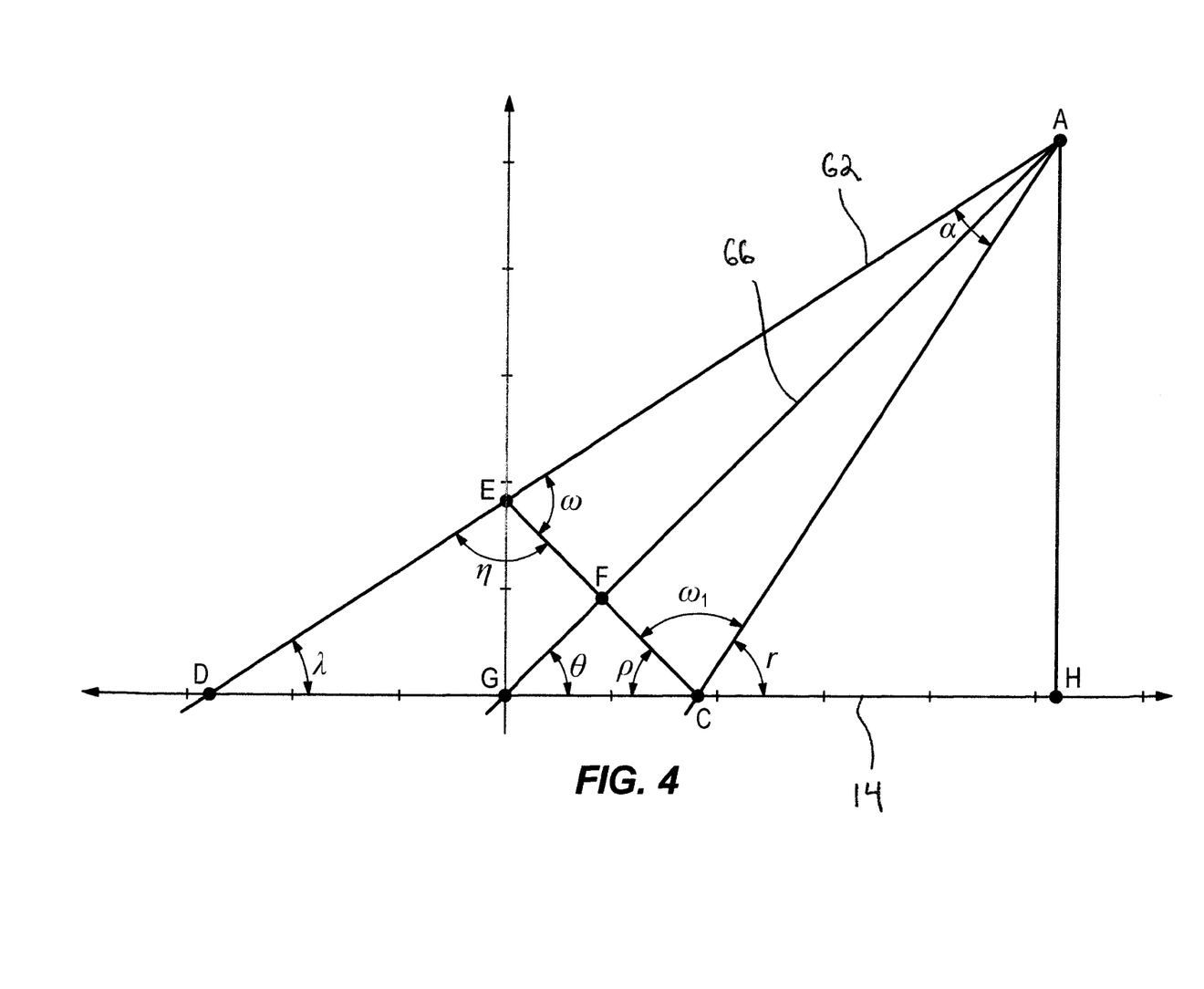
FIG. 4 illustrates triangulation of the position of the light fixture of FIG. 3 during the calibration operation.

With reference to FIGS. 3 and 4, to calculate the position of the light fixture 22', the controller 26 determines an eccentricity e of the beam pattern 58' using Equation (1), where e is the eccentricity, a is the major diameter of the ellipsebeam pattern (i.e. the distance CD), and b is the minor diameter of the beam pattern (i.e. the distance IJ).

$$e = \sqrt{(1 - b^2/a^2)} \qquad (1)$$

From the eccentricity e, the controller 26 can determine an inclination angle $\theta$, which is the included angle defined between the plane of the stage 14 and a central axis 66 of the beam 62, which intersects the plane of the stage 14 at a point G (FIG. 4). To calculate the inclination angle $\theta$, the controller 26 can use Equation (2), where e is the eccentricity, $\alpha$ is the beam angle (known for the particular light fixture 22'), and $\theta$ is the inclination angle:

$$e = \cos(\theta)/(\cos(\alpha/2)) \qquad (2)$$

With the inclination angle $\theta$ and beam angle $\alpha$ known, along with the positions of the end points C, D of the major diameter, the controller 26 solves a series of triangles to calculate a position A of the light fixture 22' relative to the stage 14. Line segment EC extends perpendicular to line segment AG, which connects the position A of the light fixture 22' to the intersection point G of the beam's central axis 66. This forms isosceles triangle AEC. Because triangle AEC is isosceles, angles $\omega$ and $\omega_1$ are equal. Therefore, angles $\omega$ and $\omega_1$ can be calculated using Equation (3):

$$\omega + \omega_1 + \alpha = 180° \qquad (3)$$

Next, angle $\rho$ can be calculated by solving right triangle CFG with Equation (4), $$\rho = 90° - \theta \qquad (4)$$

allowing angle r to be calculated using Equation (5):

$$r = 180° - \omega_1 - \rho \qquad (5)$$

Because line segment EC is perpendicular to line segment AD, angle $\eta$ can be calculated using Equation (6):

$$\eta = 180° - \omega \qquad (6)$$

Finally, angle $\lambda$ can be calculated by solving triangle DEC, using Equation (7):

$$\lambda = 180° - \eta - \rho \qquad (7)$$

With angles $\lambda$, $\eta$, $\alpha$, and r known, the lengths of line segments AH and GH are solvable, using the following system of equations, to obtain the coordinate position A of the light fixture 22':

$$EC/\sin(\lambda) = DC/\sin(\eta) \qquad (8)$$

$$\sin(\alpha/2) = FC/AC \qquad (9)$$

$$\sin(r) = AH/AC \qquad (10)$$

$$\cos(r) = HC/AC \qquad (11)$$

$$GC = \sqrt{2} * FC \qquad (12)$$

$$GH = GC + HC \qquad (13)$$

It is noted that, for a light fixture having a fixed beam angle, the angle α is known and communicated to the controller 26. For example, the specific lighting models can be sensed by the controller or manually input to the controller 26, and the controller 26 can then use a look-up table to determine the beam angle α of the specified light fixture. Alternatively, the actual beam angle α can be manually input to the controller 26. For a light fixture having a variable beam angle α, the light fixture can be adjusted to a specific, known beam angle α (e.g., maximum or minimum beam angle) before the above-described calibration operation is performed. Such adjustment of the beam angle α can be initiated via communication from the controller 26 or can be done by manual manipulation of the lighting fixture.

Figure 5:
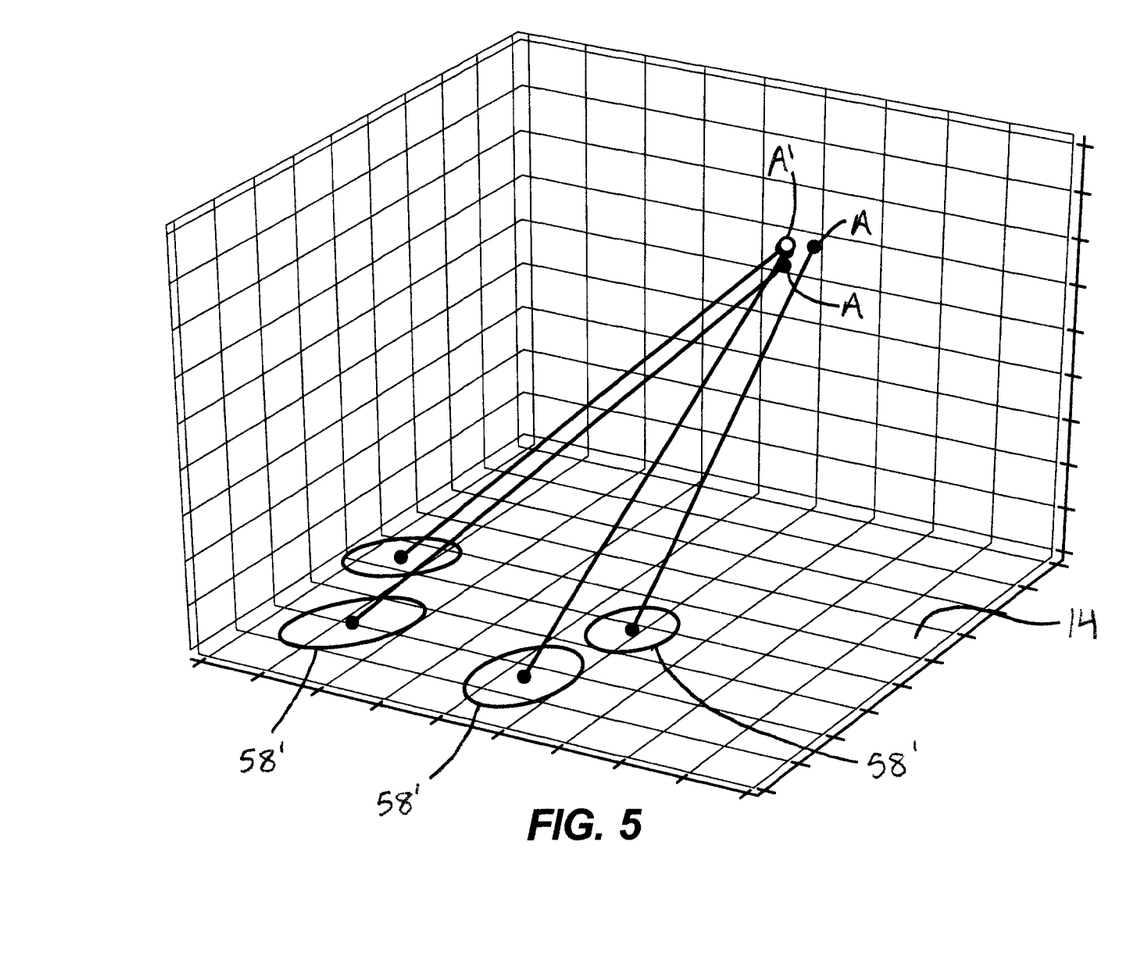
FIG. 5 illustrates an average calculated position of the light fixture of FIG. 3 based on a plurality of observed beam patterns.

Referring to FIG. 5, in some embodiments, the controller 26 may obtain data from multiple images captured by the observing device 54 and calculate the position A of the light fixture 22' multiple times. In some embodiments, the controller 26 may adjust the orientation of the light fixture 22' being calibrated to obtain a variety of different beam patterns 58'. The controller 26 then calculates the position A of the light fixture 22' for each beam pattern 58' and averages the calculated positions A to obtain a calculated average position A'.

The controller 26 may repeat the calibration operation described above for each light fixture 22 within the lighting system 10. In some embodiments, the controller 26 may calculate the position of a first one of the light fixtures 22a, and then calculate the position of a second one of the light fixtures 22b that is attached to the same support bar 38 as the first light fixture 22a. The controller 26 can then determine the locations of any additional light fixtures 22 on the same support bar 38 if the spacing of the additional light fixtures 22 relative to the first or second light fixtures 22a, 22b, is known. Accordingly, the controller 26 need only conduct the calibration operation for two light fixtures 22 on a particular support bar 38 to determine the positions of every light fixture 22 on the support bar 38.

In some embodiments, the controller 26 inputs the calculated position A or average position A' of each calibrated light fixture 22 into a light show program. The light show program can include one or more target locations 70 (i.e., locations to which the light is to be directed during the show) for the beams 62 produced by the light fixtures 22 (FIG. 1). Using the calculated position A or average position A' of each light fixture 22, the controller 26 determines a required orientation for each light fixture 22 (e.g., the orientation of the lamp assembly 34 relative to the base 30) to project their respective beams 62 to a desired target location 70.

Various features of the disclosure are set forth in the following claims.

What is claimed is:

1. A system for determining a position of a light fixture that projects a beam of light onto a stage to form a first beam pattern on the stage, the system comprising:
   an observing device located at a position relative to the stage to observe the first beam pattern; and
   a controller in communication with the observing device, the controller configured to
      capture from the observing device an image of the first beam pattern on the stage,
      determine a major dimension and a minor dimension of the first beam pattern from the image,
      determine an eccentricity of the first beam pattern based on the major dimension and the minor dimension, and
      calculate a position of the light fixture relative to the stage based on the eccentricity.

2. The system of claim 1, wherein the controller is configured to calculate the position of the light fixture by triangulation.

3. The system of claim 1, wherein the controller is configured to orient the light fixture based on the calculated position of the light fixture to aim the light fixture onto a target location on the stage.

4. The system of claim 1, wherein the beam of light defines a beam angle, and wherein the controller is configured to calculate the position of the light fixture based on the major dimension, the minor dimension, and the beam angle.

5. The system of claim 1, wherein the observing device is a camera.

6. A lighting system for illuminating a stage, the lighting system comprising:
   a light fixture including a base and a lamp assembly movable relative to the base;
   an observing device located at a position relative to the stage to observe the stage; and
   a controller in communication with the light fixture and the observing device, the controller configured to:
      control the light fixture to project a beam of light onto the stage to form a first beam pattern on the stage,
      capture from the observing device an image of the first beam pattern on the stage,
      determine an eccentricity of the first beam pattern from the image,
      calculate a position of the light fixture relative to the stage based on the eccentricity, and
      orient the light fixture, based on the calculated position, by moving the lamp assembly relative to the base to aim the light fixture onto a target location on the stage.

7. The lighting system of claim 6, wherein the controller is configured to calculate the position of the light fixture by triangulation.

8. The lighting system of claim 6, wherein the controller is configured to determine the eccentricity of the first beam pattern based on a major dimension and a minor dimension of the first beam pattern, and wherein the major dimension and the minor dimension are determined from the image.

9. The lighting system of claim 8, wherein the beam of light defines a beam angle, and wherein the controller is configured to calculate the position of the light fixture based on the major dimension, the minor dimension, and the beam angle.

10. The lighting system of claim 6, wherein the observing device is a camera.

11. A method of determining a position of a light fixture relative to a surface, the method comprising:
   projecting a beam pattern from the light fixture onto the surface with the light fixture;
   capturing an image of the beam pattern on the surface;
   determining a major dimension and a minor dimension of the beam pattern from the image;
   determining an eccentricity of the beam pattern from the major dimension and the minor dimension;
   calculating a position of the light fixture relative to the surface based on the eccentricity; and
   orienting the light fixture to illuminate a target position on the surface based on the calculated position of the light fixture.

12. The method of claim 11, wherein projecting the beam pattern includes projecting a beam of light defining a beam angle from the light fixture, wherein the beam of light intersects the surface at an inclination angle, and wherein calculating the position of the light fixture includes determining the inclination angle based on the eccentricity and the beam angle.

13. The method of claim 11, wherein capturing the image includes taking a picture of the beam pattern on the surface with a camera located at a position relative to the surface.

14. The method of claim 11, wherein orienting the light fixture includes moving a lamp assembly of the light fixture relative to a base of the light fixture.

15. The method of claim 11, further comprising inputting the calculated position of the light fixture into a light show program.

16. The method of claim 11, wherein calculating the position of the light fixture includes triangulating the position of the light fixture.

17. The system of claim 1, wherein the controller is configured to determine the eccentricity based on the equation: eccentricity=$\sqrt{(1-b^2/a^2)}$ wherein a is the major dimension, and b is the minor dimension.

18. The lighting system of claim 8, wherein the controller is configured to determine the eccentricity based on the equation: eccentricity=$\sqrt{(1-b^2/a^2)}$ wherein a is the major dimension, and b is the minor dimension.

19. The method of claim 11, wherein determining the eccentricity includes calculating the eccentricity based on the equation: eccentricity=$\sqrt{(1-b^2/a^2)}$ wherein a is the major dimension, and b is the minor dimension.

* * * * *